United States Patent [19]

Bateman

[11] Patent Number: 4,849,756

[45] Date of Patent: Jul. 18, 1989

[54] GROUND PROXIMITY WARNING SYSTEM TERRAIN CLASSIFICATION SYSTEM

[75] Inventor: Charles D. Bateman, Bellevue, Wash.

[73] Assignee: Sundstrand Data Control, Inc., Redmond, Wash.

[21] Appl. No.: 886,198

[22] Filed: Jul. 15, 1986

[51] Int. Cl.⁴ ............................................. G08B 23/00
[52] U.S. Cl. .................................. 340/970; 73/178 T; 340/963; 342/65; 364/433
[58] Field of Search ....................... 340/963, 964, 970; 73/178 R, 178 T; 364/427, 428, 433, 434, 424; 342/65; 244/180

[56] References Cited

U.S. PATENT DOCUMENTS

| | | | |
|---|---|---|---|
| 3,925,751 | 12/1975 | Bateman et al. | 340/967 |
| 3,936,796 | 2/1976 | Bateman | 340/970 |
| 3,944,968 | 3/1976 | Bateman et al. | 340/970 |
| 4,030,065 | 6/1977 | Bateman | 340/970 |
| 4,567,483 | 1/1986 | Bateman et al. | 340/970 |
| 4,675,823 | 6/1987 | Noland | 340/970 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

An aircraft ground proximity warning system is disclosed having an inadequate terrain clearance warning mode, wherein the criteria required to generate the warning is modified when the aircraft is flying over undulating or mountainous terrain. The system is responsive to signals representative of the radio altitude, the barometric altitude, the speed of the aircraft, the flap position and the landing gear position to provide warnings when the aircraft is operating below a predetermined altitude with either or both of the landing gear of the flaps not in a landing configuration. The warning system also provides a warning when the aircraft is traveling above a predetermined speed and below a predetermined altitude irrespective of the configuration of the landing gear or the flaps. Also disclosed is logic circuitry for detecting that the aircraft is flying over undulating or mountainous terrain and modifying the warning envelope during such condition to provide longer warning times.

19 Claims, 2 Drawing Sheets

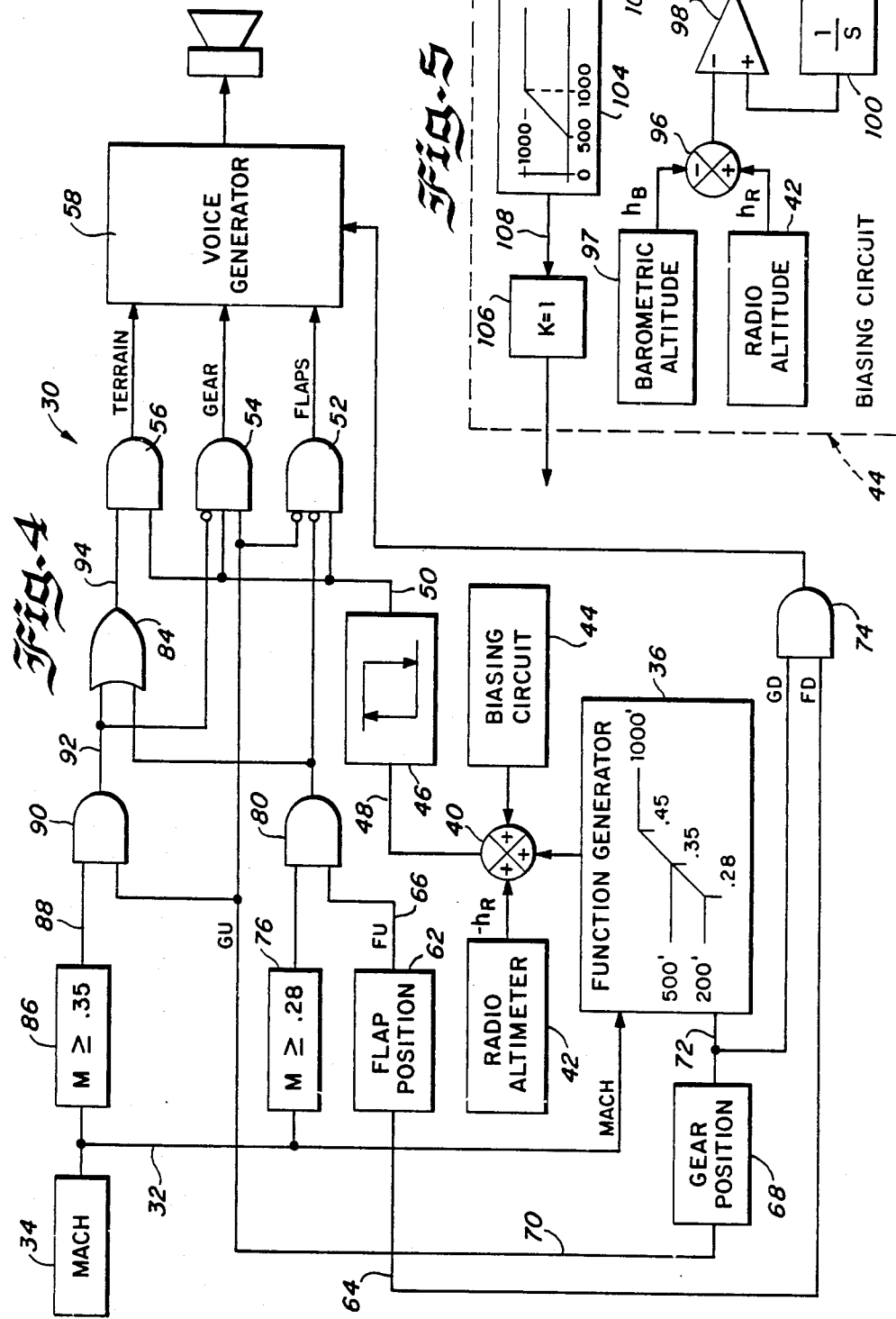

GROUND PROXIMITY WARNING SYSTEM TERRAIN CLASSIFICATION SYSTEM

CROSS REFERENCE

This application is related to an application, Ser. No. 06/886,201, for a GROUND PROXIMITY WARNING SYSTEM FOR AN EXCESSIVE DESCENT RATE OVER UNDULATING TERRAIN by Charles Donald Bateman filed on July 15, 1986 and assigned to the same assignee as the assignee of the present invention.

BACKGROUND OF THE INVENTION

1. Field of the Invention

This invention relates generally to ground proximity warning systems, and more particularly to a ground proximity warning system for aircraft of the type that provides warnings including warnings of inadequate terrain clearance wherein the criteria required to generate such a warning are modified when the aircraft is flying over undulating or mountainous terrain.

2. Description of the Prior Art

Ground proximity warning systems, including ground proximity warning system that provide warnings when the terrain clearance indicates a dangerous closure with terrain are known. Typical systems that provide a warning when the terrain clearance indicates a dangerous flight condition are disclosed in U.S. Pat. Nos. 3,936,796; 3,944,968 and 4,030,065. All of the above-mentioned patents are assigned to the same assignee as the assignee of the present invention and incorporated herein by reference.

While the warning system apparatus described in the above-mentioned references do provide satisfactory performance in most situations, they are essentially designed for the situation where an aircraft is flying over a relatively flat terrain. The warning system disclosed in the aforementioned patents provides warnings for inadequate terrain clearance up to 1000 feet of radio altitude. This is consistent with the FAA flight rules and in particular, Part 91, Subsection 91.119 for flight over relatively flat terrain. In that section, the minimum allowable altitude for an aircraft not landing or taking off is 1000 feet above the highest obstacle within a horizontal distance of five statute miles from the course to be flown. The respective flight rules concerning flight over undulating terrain or mountainous terrain dictate a minimum altitude of 2000 feet above the highest obstacle. The prior art warning systems, such as those disclosed, do not provide a warning to the pilot of an aircraft when the aircraft is flying above 1000 feet of radio altitude but over undulating or mountainous terrain and flying below the 2000 feet minimum altitude over undulating terrain. Since it is possible that aircraft will be flying over both undulating and flat terrain during the course of flight, the terrain clearance warning systems would not provide optimum results during all phases of flight. Thus there exists a need to provide a terrain clearance warning system that is modifiable when the aircraft is flying over undulating terrain to provide the pilot with a warning that the aircraft is below the prescribed altitude for undulating or mountainous terrain and to provide additional warning time to the pilot to permit appropriate action before impact.

SUMMARY OF THE INVENTION

Accordingly, it is an object of the present invention to provide a ground proximity warning system that overcomes the disadvantages of the prior art warning systems.

It is another object of the present invention to provide the pilot with a warning when the aircraft is flying over undulating or mountainous terrain and is below the minimum prescribed altitude.

It is another object of the present invention to provide a ground proximity warning system that provides a terrain closure warning system with an increased warning time when the aircraft is flying over undulating or mountainous terrain.

It is yet another object of the present invention to provide a ground proximity warning system that monitors whether or not the aircraft is flying over undulating or mountainous terrain and modifies the terrain warning envelope accordingly.

It is yet another object of the present invention to provide a warning when the aircraft is operating above a predetermined speed at an altitude above ground of 2000 feet or below when flying over undulating or mountainous terrain.

It is yet another object of the present invention to provide a warning when the aircraft is operating above a predetermined speed at an altitude above ground of 1000 feet or below when the aircraft is flying over relatively flat terrain.

Therefore, in accordance with the preferred embodiment of the invention, there is disclosed a ground proximity warning system for a dangerous terrain clearance condition that provides an improved warning to aircraft that fly over both relatively flat and undulating terrain. In the terrain clearance warning system disclosed, the warning envelope is modified when the aircraft is flying over undulating or mountainous terrain. The undulating terrain condition is sensed by circuitry which is responsive to a signal representative of the altitude of the aircraft above sea level and a signal representative of the altitude of the aircraft above ground. The signals are compared and integrated over a predetermined time period to provide a bias signal to the terrain clearance warning circuitry. Any differences between the two signals will produce a bias signal which is added to the terrain clearance warning signal for flat terrain. The modified terrain clearance warning signal will provide a warning when the aircraft is operating above a predetermined speed and operating at or below 2000 feet above ground while flying over undulating terrain. The warning system in accordance with the present invention will thus provide a warning to a pilot when the aircraft descends below the prescribed altitude in both conditions, that is, while the aircraft is flying over relatively flat terrain and while the aircraft is flying over undulating terrain. Consequently the pilot will be provided with additional warning time when flying over undulating terrain which will help reduce insufficient terrain clearance accidents.

DESCRIPTION OF THE DRAWING

These and other objects and advantages of the present invention will become readily apparent upon consideration of the following detailed description and attached drawing wherein:

FIG. 4 is a functional block diagram for implementing the warning envelopes of FIGS. 2 and 3 according to the present invention; and FIG. 5 is a functional block diagram of the circuitry for detecting whether the aircraft is flying over undulating terrain according to the present invention.

DETAILED DESCRIPTION OF THE PREFERRED EMBODIMENT

Figure 1:
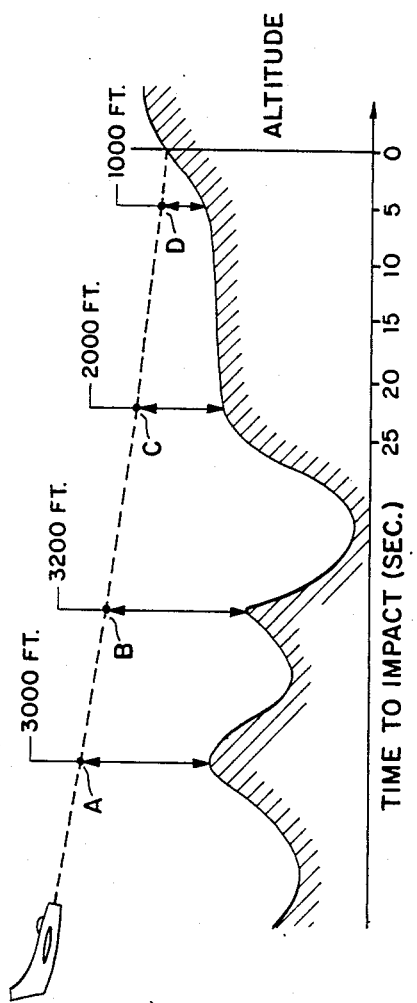
FIG. 1 is a graphical illustration of time to impact versus altitude above ground for a plurality of terrain clearances for an aircraft flying over undulating terrain.

Referring now to the drawing with particular attention drawn to FIG. 1, there is illustrated graphically an aircraft flying a particular fight path over undulating terrain wherein the minimum terrain clearances vary. Four instantaneous locations of the aircraft are shown designated in FIG. 1 by the letters A, B, C and D. As illustrated at point A, the aircraft has a terrain clearance of 3000 feet. As the aircraft proceeds along the flight path the terrain clearance as illustrated at point B is 3200 feet. As the aircraft proceeds to point C on the flight path the terrain clearance is 2000 feet. Point D illustrates the aircraft position when the terrain clearance is 1000 feet.

The horizontal axis illustrates the time to impact as a function of the terrain clearance associated with the flight path and terrain topography shown in FIG. 1. The impact times are dependent upon the terrain closure rate and the altitude of the aircraft above the terrain.

For illustration purposes, an aircraft flying over undulating terrain such as that shown in FIG. 1 at point C, where the terrain clearance is shown to be 2000 feet the time to impact would be about 25 seconds. As the terrain clearance decreases as illustrated at point D, where the terrain clearance is 1000 feet, the time to impact would be about 5 seconds.

Thus, the prior art warning systems, which provide warnings only up to 1000 feet of terrain clearance, would generate a warning in such a situation at only 5 seconds before impact. In the warning system in accordance with the present invention the warning envelope is modified when the aircraft is flying over undulating terrain to provide a warning at a terrain closure of 2000 feet and below, thereby substantially increasing the warning time. Referring to FIG. 1, the modified warning envelope would be generated when the aircraft reached point C, which corresponds to 2000 feet of terrain closure. As illustrated in FIG. 1, the time to impact at point C is 25 seconds. Thus the warning system in accordance with the present invention under the flight scenario depicted in FIG. 1, would provide the pilot with a warning time which is five times greater than that which would be provided by prior art systems in a similar situation.

Moreover, as heretofore stated, the flight regulations dictate a minimum terrain clearance of 2000 feet in mountainous terrain. The warning system in accordance with the present invention provides a warning when the aircraft descends below such prescribed minimum altitude, thus helping the pilot to monitor the terrain clearance of the aircraft when the aircraft is flying over undulating terrain. The prior art terrain clearance warning systems do not provide a warning for conditions when the terrain clearance is greater than 1000 feet.

In addition, the warning system must also be able to provide a suitable warning when the aircraft is flying over relatively flat terrain, since during the course of flight an aircraft will likely be flying over relatively flat terrain and undulating terrain. The invention disclosed herein provides for a warning envelope which is also suitable for the condition when the aircraft is flying over relatively flat terrain. The warning envelope, in accordance with the present invention, is illustrated in FIGS. 2 and 3.

Figure 2:
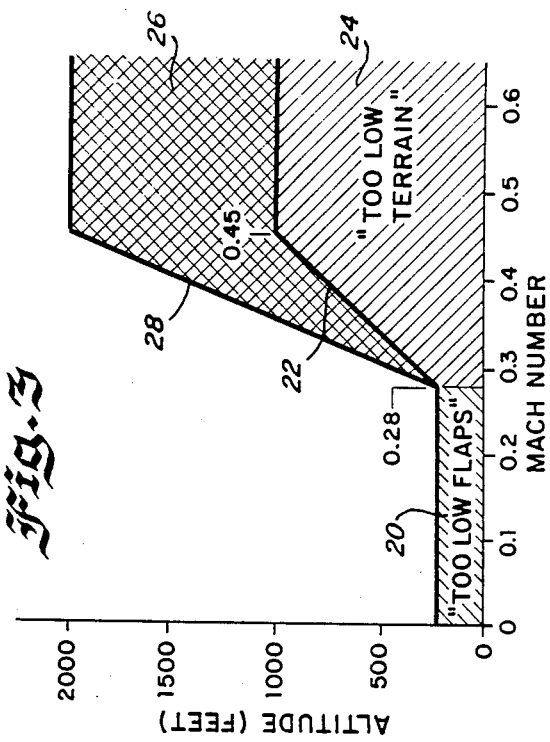
FIG. 2 is a graphical illustration of the relationship between the aircraft altitude above ground and the aircraft speed for a terrain clearance warning with a gear warning and with a modified terrain warning envelope according to the present invention.

FIG. 2 illustrates the relationship between the aircraft speed as represented by Mach number and the altitude of the aircraft above ground for generating a terrain clearance warning and a warning when the landing gear of the aircraft is up and the aircraft is below a predetermined altitude and speed. As shown in FIG. 2, whenever the speed of the aircraft is less than 0.35 Mach and the aircraft is at an altitude above ground of 500 feet or below with the landing gear up, a "TOO LOW GEAR" warning will be provided as indicated by a cross-hatched portion 10 of FIG. 2. For aircraft speeds between 0.35 and 0.45 Mach, the warning boundary indicated by a line 12 will be a function of the altitude of the aircraft above ground and the speed of the aircraft. As indicated in FIG. 2, for the region between 0.35 and 0.45 Mach, the greater the aircraft speed the higher the altitude above ground for which a warning will be given. At aircraft speeds of 0.45 Mach and greater, a warning will be provided whenever the altitude of the aircraft is less than 1000 feet as indicated by a cross-hatched portion 14 of the warning envelope.

Cross-hatched portions 10 and 14 are illustrative of a warning envelope for an aircraft suitable when such aircraft is flying over relatively flat terrain. A cross-hatched portion 16 of the warning envelope represents the modified portion of the warning envelope which is utilized when an aircraft is flying over undulating terrain. As can be seen from FIG. 2, when the aircraft is flying at speeds of less than 0.35 Mach, the warning envelope is the same as that for an aircraft which is flying over a relatively flat terrain. However, at speeds between 0.35 and 0.45 Mach, the modified warning boundary, indicated by line 18, ramps up to a value representative of 2000 feet above ground. The modified warning boundary is much steeper than the warning boundary indicated by the line 12, which is for aircraft flying over relatively flat terrain. The modified warning boundary provides for a warning at higher altitudes above ground which results in increased warning time. Thus it should be apparent from the illustration in FIG. 2 and the discussion herein that a warning envelope is provided, which is adaptable for aircraft which fly over both flat terrain and undulating terrain. As heretofore discussed, such a warning envelope provides greatly increased warning time in which a pilot may take evasive action when flying over undulating terrain. The warning envelope also provides warnings when the altitude of the aircraft above ground drops below the minimum altitudes prescribed by the FAA when the aircraft is traveling at a speed of 0.45 Mach or greater.

Figure 3:
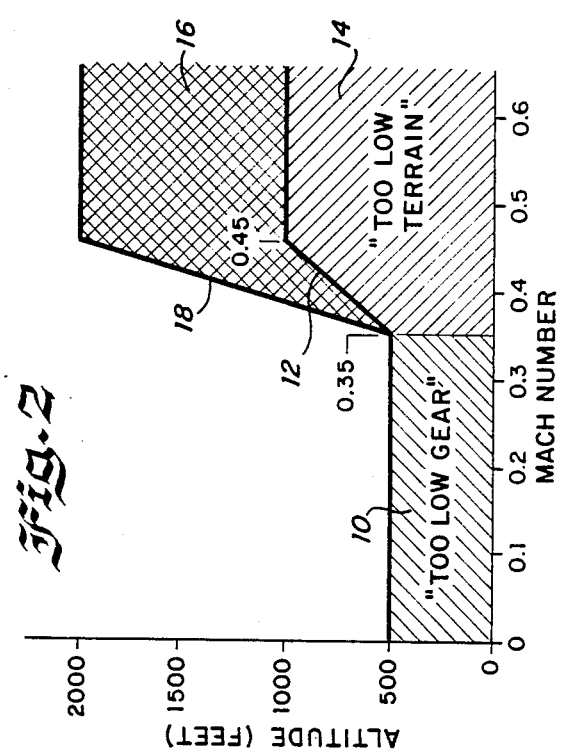
FIG. 3 is a graphical illustration of the relationship between the aircraft altitude above ground and aircraft speed for a terrain clearance warning with a flaps warning and a modified terrain warning envelope according to the present invention.

Similar to FIG. 2, the graph in FIG. 3 illustrates the operation of the terrain clearance warning system which further illustrates the warning envelope for the condition when the flaps are not in a landing configuration and the altitude of the aircraft above ground is 200 feet or below. As can be seen from FIG. 3, at aircraft speeds of 0.28 Mach and below, a warning will be provided when the aircraft is at 200 feet or below and the flaps are not in a landing configuration. This portion of the warning envelope is indicated by cross-hatched portion 20. When the speed of the aircraft is between 0.28 and 0.45 Mach the warning boundary, indicated by line 22, varies as a function of the aircraft speed and the altitude. Generally, in this region the greater the speed of the aircraft the higher the altitude before the warning is given. At speeds of 0.45 Mach and above, a warning is given when the closure of the aircraft is 1000 feet or below. This section of the warning envelope is designated by cross-hatched portion 24 and is utilized for conditions when the aircraft is flying over relatively flat terrain. When the aircraft is flying over undulating terrain the warning envelope is modified, by adding a portion thereto identified as cross-hatched portion 26. In the modified portion at aircraft speeds between 0.28 Mach and 0.45 Mach the warning boundary rises much more sharply as indicated by line 28. At speeds of 0.45 Mach and above a warning is provided when the aircraft falls below 2000 feet of altitude above ground.

It thus should be apparent from FIGS. 2 and 3 that warning envelopes have been disclosed which are a function of the speed of the aircraft and the terrain closure associated therewith, responsive to the landing gear and flap configuration. Moreover, the warning envelopes are modified to provide greater warning time to the pilot when the aircraft is flying over undulating terrain.

A functional block diagram for implementing the terrain warning system having the characteristics illustrated in graphs shown in FIGS. 2 and 3 is presented in FIG. 4. In FIG. 4 there is illustrated a ground proximity warning system according to the invention generally designated by the reference numeral 30. The system 30 according to the invention is illustrated in a functional or block diagram form as a series of gates, comparators and the like for purposes of this illustration; however, it should be understood that the actual implementation of logic can be other than that shown in FIG. 4, with various digital and analog implementations being possible. The signals used by the warning system as described include signals representative of radio altitude, barometric altitude, signals representative of the aircraft flap position and the landing gear configuration, and a signal representative of the speed of the aircraft. The signals can be obtained from a radio altimeter, a barometric altimeter, a Mach meter and discrete circuit elements indicating the position of the gear and flaps. On certain new aircraft some of these signals may be obtained from a digital data bus (not shown).

A signal representative of the aircraft speed is applied over line 32 from a Mach meter 34 or similar device. This signal is input to several devices, one of which is a function generator 36. The function generator 36 provides a signal representative of the general characteristics of the warning envelope for the system. Specifically, if a signal representative of 0.28 Mach or less is input to the function generator 36, a signal representative of 200 feet will be output. Similarly, for an input signal representative of between 0.28 Mach and 0.35 Mach a proportional signal representative of between 200 to 500 feet altitude above ground will be output. When a signal representative of an aircraft speed of 0.45 Mach is applied, the function generator 36 will provide a signal representative of 1000 feet of altitude. Thus it should be apparent that the function generator 36 is used to directly provide portions 10, 14, 20, 24 of the warning envelopes illustrated in FIGS. 2 and 3, respectively. Portions 16 and 26 of the warning envelopes are composed of composite signals generated by the function generator 36 and a biasing signal which will be discussed subsequently in detail.

The output of the function generator 36 is applied to a summing junction 40 along with signals from a radio altimeter 42 and a signal from a biasing circuit, shown generally as a dashed box 44, which will hereinafter be described in detail, for modifying the warning envelope when the aircraft is flying over undulating terrain. A comparator circuit 46 receives the output from the summing junction 40 over a line 48. The comparator 46 will generate a logic signal over a line 50 and apply it to AND gates 52, 54 and 56. A positive logic signal will be applied over the line 50 when either the landing gear or the flaps or both are not in a landing configuration and the aircraft is below a desired altitude. A positive logic signal from the comparator 46 is also indicative that the aircraft is at too low of an altitude for the speed at which it is operating.

A signal representative of the flap position is supplied by a discrete element identified in FIG. 4 by a function block 62. A positive logic signal is applied over a line 64 when the flaps are in a landing configuration; identified as an FD signal. A positive logic signal is applied over a line 66 when the flaps are up and identified as an FU signal.

A discrete element identified by a block 68 provides a signal representative of the landing gear configuration. A positive logic signal applied over a line 70 indicates that the landing gear is up; identified as a GU signal. A positive logic signal applied over a line 72 indicates the landing gear is down and is identified by a GD signal.

The GD signal and the FD signal are applied to an AND gate 74. If both the landing gear and the flaps are down, then a positive logic signal is applied to the voice generator 58. This signal from AND gate 74 will inhibit the voice generator 58 thus eliminating nuisance warnings when the aircraft is landing.

The GEAR warning is controlled by an AND gate 54 which receives signals from the AND gate 90, the comparator 46 and a GU signal. A signal from the AND gate 90 is applied to an inverted input of the AND gate 54. This input will be enabled whenever a zero logic signal is output from the AND gate 90. A zero logic signal will be output from the AND gate 90 whenever the gear is in a down position or the speed of the aircraft is less than 0.35 Mach. A GU signal is applied to another input of AND gate 54 along with a signal from the comparator 46 so as to enable the GEAR warning only when the landing gear is in an up position and the signal from the comparator 46 indicates that the aircraft is below an altitude of 500 feet above ground.

A signal representative of the speed of the aircraft is further applied to a comparator 76 over line 32. The comparator 76 will provide a positive logic signal to an AND gate 80 when the signal from the Mach meter is greater than or equal to a signal representative of 0.28 Mach. A FU signal is also applied to the AND gate 80. If the speed of the aircraft is greater than 0.28. Mach and the landing gear is up, the AND gate 80 will be enabled. The output of the AND gate 80 is applied to an inverted input to the AND gate 52. The AND gate 52 also receives a signal from the comparator 46 and a GU signal. The GU signal is applied to an inverted input to the AND gate 52. When the AND gate 52 is enabled a positive logic signal is applied to the voice generator 58 to generate a FLAPS warning which indicates that the aircraft is flying at too low of an altitude and below a predetermined speed with the flaps up.

A signal representative of the speed of the aircraft is also applied to a comparator 86. This comparator will provide a positive output signal over line 88 when the speed of the aircraft is greater than 0.35 Mach. The output from the comparator 86 is input to an AND gate 90 along with a GU signal. When positive logic signals are provided at both inputs of the AND gate 90 a positive logic signal is output and applied to the OR gate 84 over line 92. The OR gate 84 also receives an input from the AND gate 80 such that a positive logic signal will be applied to the AND gate 56 when either a positive logic signal is applied by AND gate 90 or AND gate 80. The output of the OR gate 84 is input to the AND gate 56 which cooperates with the comparator 46 to initiate a TERRAIN warning. The TERRAIN warning is initiated when the OR gate 84 is enabled and a positive logic signal is provided from the comparator 46. The OR gate 84 is enabled under two conditions; first, the gear is in an up position and the speed of the aircraft is equal or greater than 0.35 Mach; second, the flaps are in an up position and the speed of the aircraft is equal to or greater than 0.28 Mach. When either of the two conditions are present, a positive logic signal will be applied over line 94 to the AND gate 56, thus placing it under the control of the comparator 46 to generate a TERRAIN warning when the aircraft is operating at a combination of altitude and speed that falls within the warning envelopes shown in FIGS. 2 and 3.

The output of the AND gates 52, 54 and 56 are applied to the voice generator 58. A positive logic signal applied to the voice generator 58 will cause a warning to be generated through a loudspeaker or headphones or other similar transducer. A typical voice generator apparatus for this purpose is described in U.S. Pat. Nos. 4,030,065 and 3,925,751 which are herein incorporated by reference.

The logic circuitry heretofore described refers to that circuitry necessary to provide the warning envelopes designated by cross-hatched portions 10 and 14 in FIG. 2, and 20 and 24 in FIG. 3. These portions of the warning envelopes are for use when the aircraft is flying over relatively flat terrain.

Referring to FIG. 5, a unique circuit is described which provides a bias signal which is applied to the summing junction 40 to modify the warning envelope when the aircraft is flying over undulating terrain. This circuit is shown generally enclosed within the function block 44. The bias circuit will provide the modified warning envelopes identified as portions 16 and 26 of FIGS. 2 and 3, respectively.

In general, the biasing circuitry 44 detects the topography of the terrain over which the aircraft is flying. This is accomplished by taking the difference between radio altitude and barometric altitude of an aircraft. At any particular time, the difference between the barometric altitude and the radio altitude of an aircraft will be equivalent to the barometric altitude of the terrain at the point being overflown by the aircraft at that particular time. While an aircraft is flying over relatively flat terrain, the signal representative of the difference will be constant. However, when the aircraft is flying over undulating terrain, the signal will vary with time as a function of the topography of the terrain and the speed of the aircraft. This signal will thus be indicative of the fact that the aircraft is flying over undulating terrain. The difference signal can be integrated with respect to time to provide a biasing signal which is a function of the difference.

Specifically, a signal representative of the radio altitude is obtained from the radio altimeter 42 and applied to a positive input of a summing junction 96. A signal representative of the barometric altitude obtained from a barometric altimeter 97 or an air data computer is applied to the negative input of the summing junction 96. The output of the summing junction 96 is applied to an inverting input of an amplifier 98.

An integrator 100 is connected to the output of the amplifier 98 and to a non-inverting input of the amplifier 98 thus forming a closed feedback loop. The integrator functions to provide a biasing signal which is a function of the difference of the signals representative of the radio altitude and the barometric altitude. The integrator constants are selected so as to cancel with the signal applied to the inverted input after a predetermined time. After the predetermined time the output signal from the circuit will be reset. In other words, after the predetermined time period, there will be no signal at the output of amplifier 98 on line 102. In the preferred embodiment, it is also desirable to inhibit the biasing circuitry under the following conditions: failure of either the barometric or radio altimeter or radio altitude of the aircraft greater than a predetermined amount, e.g., 5000 feet. Thus the integrator 100 is inhibited under these conditions.

The output of the amplifier 98 is applied to a function generator 104. The function generator 104 supplies a bias signal based upon the amplifier 98 output which is scaled by an amplifier 106 to provide a signal representative of between 0 and 1000 feet of altitude. This signal is applied over a line 108 to the summing junction 40 to modify the warning envelopes when the aircraft is flying over undulating terrain. The bias signal will thus modify the warning envelope such that at Mach numbers greater than 0.45, the upper boundary of the warning envelope will be 2000 feet as shown by cross-hatched portion 16 in FIG. 2 and cross-hatched portion 26 in FIG. 3 when the aircraft is flying over undulating terrain.

In the preferred embodiment, a two minute time period for the integrator 100 is selected. Although other time periods will also work, the two minute time period was selected to cover a distance which would span a plurality of points of inflection in the terrain. Typically, an aircraft which is flying at a normal cruising speed will travel approximately twelve nautical miles in that period. In many regions this distance will be sufficient to span a plurality of points of inflection in the terrain.

Obviously many modifications and variations of the present invention are possible in light of the above teachings. Thus, it is understood that, within the scope of the appended claims, the invention may be practiced otherwise than as specifically described above.

What is claimed and desired to be secured by a Letters Patent of the United States is:

1. A terrain clearance warning system for an aircraft comprising:

warning signal generating means for providing a warning signal representative of inadequate terrain clearance while the aircraft is flying over relatively flat terrain;

a first source of signals representative of the radio altitude of the aricraft;

a second source of signals representative of the barometric altitude of the aircraft;

decting means for detecting whether the aircraft is flying over undulating terrain, wherein said detecting means does not require signals representative of the longitude or latitude of the aircraft, responsive to said first source of signals and said second source of signals, including comparing means for comparing said radio altitude signals with said barometric altitude signals for developing a difference signal which varies with time as a function of undulating terrain whereby when the difference signal exceeds a predetermined limit an undulating terrain condition exists;

and biasing means, responsive to said detecting means, for biasing said warning signal when the aircraft is flying over undulating terrain.

2. The terrain clearance warning system as recited in claim 1 further including means for integrating said difference signal for a predetermined time period.

3. The terrain clearance warning system as recited in claim 2 wherein said predetermined time period is substantially equal to two minutes.

4. A ground proximity warning system for an aircraft comprising:

a first source of signals representative of the altitude of the aircraft above ground;

a second source of signals representative of the altitude of the aircraft above a datum;

first means responsive to a signal representative of the altitude of the aircraft above ground and to the speed of the aircraft for generating a first signal when the terrain clearance is within a predetermined envelope for the altitude and the speed at which the aircraft is flying;

detecting means for providing a signal representing that the aircraft is flying over undulating terrain, wherein said detection means does not require signals representative of the longitude or latitude of the aircraft means for comparing said altitude above ground signal with said altitude of the aircraft above a datum signal for developing a difference signal which varies with time as a function of undulating terrain whereby when the difference signal exceeds a predetermined limit an undulating terrain condition exists;

second means responsive to said detecting means for providing a biasing signal to said first signal when said aircraft is flying over undulating terrain; and third means responsive to said first means and second means for generating a terrain clearance warning.

5. A ground proximity warning system as recited in claim 4 wherein said first means is further responsive to a signal representative of the landing gear position.

6. A ground proximity warning system as recited in claim 4 wherein said first means is further responsive to a signal representative of the flap position.

7. A ground proximity warning system as recited in claim 4 further including means for inhibiting said first means above an altitude of approximately 1000 feet.

8. A ground proximity warning system as recited in claim 4 further including means for inhibiting said biasing means above an altitude of approximately 2000 feet.

9. A terrain clearance warning system for an aircraft comprising:

a source of signals representative of the altitude of the aircraft above ground;

a source of signals representative of the speed of the aircraft;

a source of signals representative of the barometric altitude of the aircraft;

first means responsive to said sources of signals representative of the altitude of the aircraft above ground and the airspeed of the aircraft for generating a warning signal which is related to the speed of the aircraft and the altitude of the aircraft above ground;

detecting means responsive to said source of signals representative of the altitude of the aircraft above ground and the barometric altitude of the aircraft for providing a signal representing that the aircraft is flying over undulating terrain, wherein said detecting means does not require signals representative of the longitude or latitude of the aircraft and includes comparing means for comparing said altitude above ground signals with said barometric altitude signals for developing a difference signal which varies with time as a function of undulating terrain whereby when the difference signal exceeds a predetermined limit an undulating terrain condition exists; and biasing means responsive to said detecting means for biasing said warning signal when said aircraft is flying over undulating terrain.

10. A terrain clearance warning system as recited in claim 9 further including a source of signals representative of the landing gear position; wherein said warning means is responsive to said source of signals representative of the landing gear position for generating a third warning signal when said aircraft is below a predetermined altitude above ground and below a predetermined airspeed with the landing gear in an up position.

11. A terrain clearance warning system as recited in claim 9 further including a source of signals representative of the flap position; wherein said warning means is responsive to said source of signals representative of the flap position for also generating a fourth warning signal when the aircraft is below a predetermined altitude above ground and below a predetermined airspeed with the flaps in an up position.

12. A terrain clearance warning system as recited in claim 9 further including means for inhibiting said first means above an altitude of approximately 1000 feet.

13. A terrain clearance warning system as recited in claim 9 further including means for inhibiting said first means above an altitude of approximately 2000 feet.

14. A terrain clearance warning system as recited in claim 9 further including:

a source of signals representative of the position of the landing gear;

a source of signals representative of the flap position; and inhibiting means responsive to said sources of signals representative of the position of the landing gear and the flaps for inhibiting said warning means when both the landing gear and flaps are down.

15. An apparatus for detecting whether an aircraft is flying over undulating terrain comprising:
   a source of signals representative of the altitude of the aircraft above ground;
   a source of signals representative of the barometric altitude of the aircraft; and
   detecting means responsive to said sources of signals representative of the altitude of the aircraft above ground and the barometric altitude of the aircraft for providing a signal representative of undulating terrain beneath the aircraft, wherein said detecting means does not require signals representative of the longitude or latitude of the aircraft and includes comparing means for comparing said altitude above ground signals with said barometric altitude signals for generating a difference signal which varies with time as a function of undulating terrain whereby when the difference signal exceeds a predetermined limit an undulating terrain condition exists.

16. An apparatus as recited in claim 15 wherein said detecting means includes means for integrating said difference signal for a predetermined time period.

17. An apparatus as recited in claim 16 wherein said predetermined time period is approximately two minutes.

18. A method for determining whether an aircraft is flying over undulating terrain comprising the steps of:
   providing a source of signals representative of the altitude of the aircraft above ground;
   providing a source of signals representative of the altitude of the aircraft above a predetermined datum altitude;
   subtracting the signals representive of the altitude of the aircraft above ground from the signals representative of the altitude of the aircraft above the datum altitude to provide a difference signal which varies with time as a function of undulating terrain whereby when the difference signal exceeds a predetermined limit an undulating terrain condition exists; and
   integrating the difference signal over a predetermined period of time.

19. A method as recited in claim 18 wherein said predetermined time period is approximately two minutes.

* * * * *